F. G. SIMPSON.
TRANSMITTING APPARATUS FOR WIRELESS TELEGRAPH STATIONS.
APPLICATION FILED NOV. 24, 1915.
1,222,567.
Patented Apr. 10, 1917.
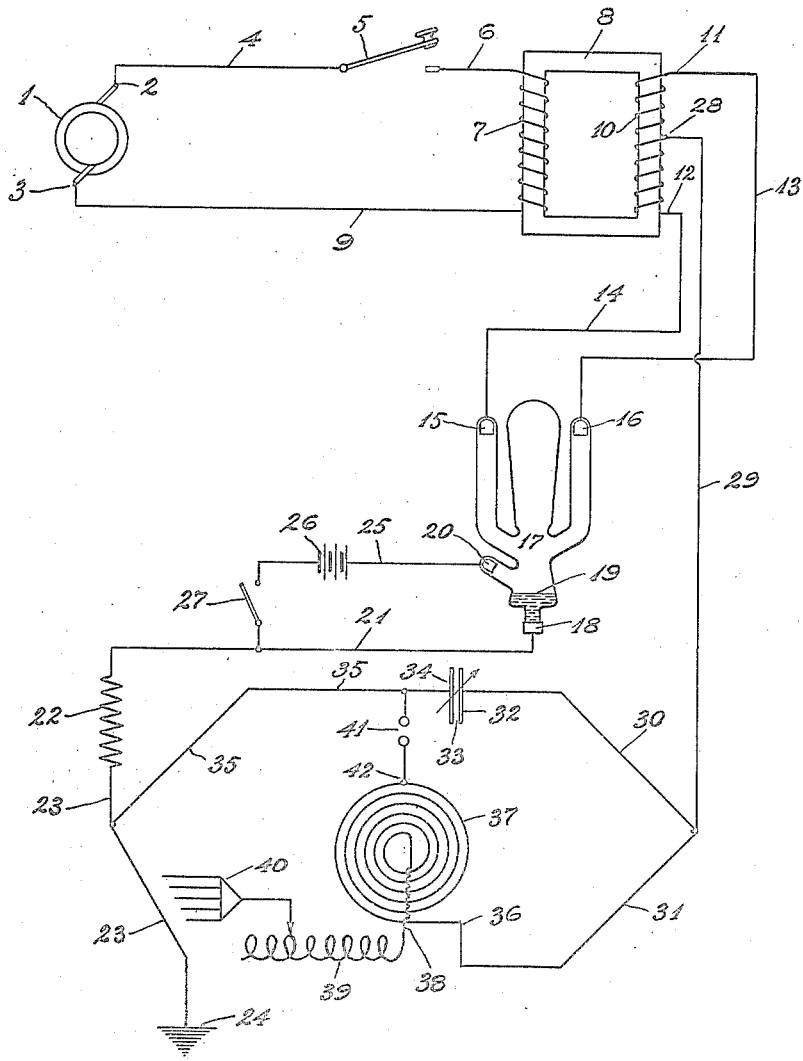
WITNESS
INVENTOR
Frederick G. Simpson
BY
ATTORNEY

UNITED STATES PATENT OFFICE.

FREDERICK G. SIMPSON, OF SEATTLE, WASHINGTON.

TRANSMITTING APPARATUS FOR WIRELESS-TELEGRAPH STATIONS.

1,222,567. Specification of Letters Patent. Patented Apr. 10, 1917.

Application filed November 24, 1915. Serial No. 63,311.

*To all whom it may concern:*

Be it known that I, Frederick G. Simpson, citizen of the United States, residing at Seattle, in the county of King and State of Washington, have invented a certain new and useful Improvement in Transmitting Apparatus for Wireless-Telegraph Stations, of which the following is a specification.

My invention relates to improvements in transmitting apparatus of wireless telegraph stations, parts of which are disclosed in my co-pending application for United States Letters Patent for transmitting apparatus for wireless telegraph stations, which application was filed November 24, 1915, and bears Serial No. 63,310, and the object of my present invention is to provided electrical apparatus, including an antenna, electric circuits, an electric generator for supplying an alternating current of electricity, and a transformer, which apparatus shall be adapted to control and modify the alternating current of said electric generator to propagate successive groups of electrical impulses only of a like polarity in a charging circuit, whereby oscillations may be generated in an associated oscillating circuit during the whole period of each of the successive electrical impulses generated by said electric generator irrespective of the different polarities of said impulses; that is to say during the whole period of each cycle comprising two successive electrical impulses, each of a different polarity, generated by said electric generator, and whereby distinctive electromagnetic wave trains representing intelligible messages may be radiated from said antenna to actuate suitable translating devices of a distant wireless telegraph station.

I accomplish this object by devices which are diagrammatically illustrated in the accompanying drawing wherein 1 designates a generator that is adapted to generate an alternating current of electricity and which is provided with brush terminals 2 and 3, and said terminal 2 is connected by a conductor 4 to one terminal of a telegraph key 5 whose other terminal is connected by a conductor 6 with one terminal of the primary coil 7 of a transformer 8, the other terminal of said coil 7 being connected by a conductor 9 to the brush terminal 3 of said generator 1, whereby a depression of said telegraph key 5 will cause the coil 7 to be energized in a well known manner.

The transformer 8 is provided with a secondary coil 10 whose two terminals 11 and 12 are connected by conductors 13 and 14, respectively, each to a different one of the two anodes 15 and 16 of a mercury valve 17, of well known form having a single cathode terminal 18 in contact with its mercury 19 and further having an auxiliary anode 20.

The cathode terminal 18 is connected by a conductor 21 to one terminal of a resistance coil 22 whose other terminal is connected by a conductor 23 with the earth 24.

The auxiliary anode 20 is connected by conductor 25 to one terminal of a source of electricity, as the battery 26, whose other terminal is connected to one terminal of a switch 27, whose other terminal is connected to the conductor 21 at a point between the cathode 18 and resistance coil 22, thus to form a switch-controlled local circuit between the cathode 18 and the auxiliary anode 20.

Connected to the central convolution 28 of the secondary coil 10 is a neutral tap consisting of a conductor 29 which extends to and connects with one end of both of two conductors 30 and 31, and the other end of the conductor 30 is connected to one side 32 of a variable condenser 33 whose other side 34 is connected by a conductor 35 to the conductor 23 at a point thereon between the resistance 22 and the earth 24, while the other end of the conductor 31 is connected to the terminal 36 of a spiral conductor 37 whose inner terminal 38 is connected to one terminal of a variable inductance 39 whose other terminal is connected to an antenna 40.

An adjustable spark gap 41 is disposed with one of its terminals connected to the conductor 35 at a point thereon between the conductor 23 and the condenser 33, while its other terminal is connected to the outermost convolution of the spiral conductor 37 at a point 42 thereon.

The apparatus thus arranged and described as constituing my present invention embodies a trigger or discharge circuit consisting of the condenser 33, the conductor 30, the conductor 31, that portion of the outermost convolution of the spiral conductor 37 which extends between the points 36 and 42, the spark-gap 41 and a portion of the conductor 35, and also embodies an oscillating circuit which includes the condenser 33, the conductors 30 and 31, all of the convolutions of the spiral conductor 37, the variable inductance 39, the antenna 40, the earth connection 24, a part of the conductor 23 and all of the conductor 35, which trigger circuit and oscillating circuit, as thus arranged, adapts the apparatus to utilize both halves of each complete cycle of the alternating current generated by the generator 1, instead of only one-half thereof, by reason of the neutral tap conductor 29 being connected with the central convolution 28 of the secondary coil 10 of the transformer 8 and the employment of a mercury valve, as mercury valve 17, having two anodes each of which is connected to a different one of the terminals 11 and 12 of said secondary coil 10, whereby, in accordance with well known laws, each half of each complete cycle of the alternating current induced in said secondary coil 10 will flow in the same direction to reach the conductor 21 through one or the other of the anodes 15 or 16; and therefore upon manipulating the telegraph key 5 in the operation of sending a message there will be twice as many impulses that will charge the condenser 33 and twice as many resultant groups of oscillations in the oscillating circuit than would be possible in the operation of the apparatus illustrated and described in my said co-pending application of even date herewith, and the pitch of the note of the signal emitted from the antenna will be one octave higher than that of the signal emitted from the antenna of the apparatus described in said co-pending application, but in all other respects the construction, arrangement and operation of the apparatus embodying my present invention is like that of the apparatus described in my said co-pending application of even date herein.

It will be obvious to those skilled in the art that in place of the mercury valve 17 there may be substituted one of other well known forms of valves or rectifiers, as, for instance, an electrolytic rectifier having two anodes and one cathode, without departing from the spirit of my invention.

What I claim is:

1. In a transmitting apparatus for radio telegraph stations, the combination with a trigger circuit which includes a condenser and a spark-gap connected in series with each other, of an oscillating circuit which includes an earth connection, said condenser, a variable inductance and an antenna connected in series with each other; and a charging circuit which includes the secondary coil of an alternating current transformer and a mercury valve having two anodes and one cathode, said secondary coil being connected at its neutral point with said oscillating circuit at a point thereon between said condenser and said variable inductance, the opposite ends of said secondary coil being each connected to a different one of said anodes while said cathode is connected to said oscillating circuit at a point between said earth connection and said condenser.

2. In a transmitting apparatus for radio telegraph stations, the combination with a trigger circuit and an oscillating circuit, of a charging circuit connected with said trigger circuit and with said oscillating circuit, which charging circuit includes the secondary coil of an alternating current transformer, a neutral tap conductor connecting the neutral point of said secondary coil directly with a conducting wire forming a part of both said trigger circuit and said oscillating circuit; and a valve comprising an electrolytic rectifier interposed between each of the two terminals of said secondary coil and one point on said oscillating circuit.

3. In a transmitting apparatus for radio telegraph stations, the combination with a trigger circuit and an oscillating circuit, of a charging circuit connected with said trigger circuit and with said oscillating circuit, which charging circuit includes the secondary coil of an alternating current transformer, a neutral tap conductor connecting the neutral point of said secondary coil directly with a conducting wire forming a part of both said trigger circuit and said oscillating circuit; and a rectifying lve interposed between each of the two t͜ͅmi-nals of said secondary coil and the same point on said oscillating circuit.

4. A transmitting apparatus for wireless telegraph stations, which embodies an oscillating circuit which includes an antenna, a variable inductance, all of the convolutions of a spiral conductor, and a condenser; a trigger circuit associated with said oscillating circuit, which trigger circuit includes a spark-gap and that portion of said oscillating circuit within which is disposed only a portion of said spiral conductor and said condenser; and a charging circuit which includes a secondary coil of an alternating current transformer, a neutral tap conductor connecting said secondary coil with said trigger circuit and said oscillating circuit, and a mercury valve having two anodes connected each to a different one of the terminals of said secondary coil and having one cathode connected to said oscillating circuit.

5. A transmitting apparatus for wireless telegraph stations, which embodies an oscillating circuit which includes an antenna, a variable inductance, all of the convolutions of a spiral conductor, and a condenser; a trigger circuit associated with said oscillating circuit, which trigger circuit includes a spark-gap and that portion of said oscillating circuit within which is disposed only a portion of said spiral conductor and said condenser; and a charging circuit which includes a secondary coil of an alternating current transformer, a neutral tap conductor connecting said secondary coil with said trigger circuit and said oscillating circuit, and a valve comprising an electrolytic rectifier interposed between each of the terminals of said secondary coil and the same point on said oscillating circuit.

In witness whereof I hereunto subscribe my name this 15th day of November, A. D. 1915.

FREDERICK G. SIMPSON.

Witnesses:
 FRANK WARREN,
 O. JOHNSON.